(12) United States Patent
Forrest

(10) Patent No.: US 6,685,029 B2
(45) Date of Patent: Feb. 3, 2004

(54) BEDDING SEPARATOR

(76) Inventor: Rasy Lee Forrest, Rte. 2, Box 96-A, Meeker, OK (US) 74856

( * ) Notice: Subject to any disclaimer, the term of this patent is extended or adjusted under 35 U.S.C. 154(b) by 0 days.

(21) Appl. No.: 10/361,324

(22) Filed: Feb. 10, 2003

(65) Prior Publication Data

US 2003/0150781 A1 Aug. 14, 2003

Related U.S. Application Data

(60) Provisional application No. 60/354,959, filed on Feb. 11, 2002.

(51) Int. Cl.$^7$ .............................. B07B 1/49; B07C 5/12
(52) U.S. Cl. ....................... 209/405; 209/675; 209/677; 209/682; 209/417
(58) Field of Search ................................ 209/675, 677, 209/682, 405, 408, 417

(56) References Cited

U.S. PATENT DOCUMENTS

| | | | | |
|---|---|---|---|---|
| 495,945 A | * | 4/1893 | McDonough | 209/394 |
| 517,724 A | * | 4/1894 | Beers | 209/413 |
| 622,216 A | * | 4/1899 | Frazee | 56/329 |
| 1,026,265 A | * | 5/1912 | Hunnicutt | 209/397 |
| 1,424,451 A | * | 8/1922 | Crandall | 209/413 |
| 1,538,676 A | * | 5/1925 | Bell | 209/405 |
| 1,593,447 A | * | 7/1926 | Jonassen | 209/417 |
| 3,833,119 A | * | 9/1974 | Brown | 209/675 |
| 4,122,001 A | * | 10/1978 | Snyder | 209/675 |
| 4,222,866 A | * | 9/1980 | Wilson | 209/417 |
| 4,350,584 A | * | 9/1982 | Donington | 209/352 |
| 4,519,507 A | * | 5/1985 | Gillette et al. | 209/682 |
| 4,525,270 A | * | 6/1985 | McCann | 209/44 |
| 4,988,005 A | * | 1/1991 | Graham | 209/419 |
| 5,325,971 A | * | 7/1994 | Moran | 209/417 |
| D405,564 S | * | 2/1999 | Martin | |
| 5,927,513 A | * | 7/1999 | Hart | 209/677 |
| 6,095,340 A | * | 8/2000 | Dedrick | 209/417 |
| 6,334,538 B1 | * | 1/2002 | Nettles | 209/418 |

* cited by examiner

*Primary Examiner*—Donald P. Walsh
*Assistant Examiner*—Jonathan R Miller

(57) ABSTRACT

A tool designed for separating manure, loose hay and wet bedding from the stall of an animal. The tool comprises a rectangular frame supporting a plurality of spaced parallel rods. The rods extend downwardly at an angle from a wall of the stall such that the lower ends of the rods or the portion of the grate supporting the rods extend into a receiver such as a muck bucket or wheel barrow. When refuse is tossed from a floor of the stall onto the grate, then manure, loose hay and soiled or wet bedding will flow down the grate into the receiver, while reusable bedding will pass through the spaces between the rods for later reuse. The frame is provided with side members which converge at their lower ends to funnel refuse into the container.

2 Claims, 3 Drawing Sheets

BEDDING SEPARATOR

CROSS-REFERENCE TO RELATED APPLICATION

This application is a non-provisional application based upon Provisional application Serial No. 60/354,959, filed Feb. 11, 2002.

BACKGROUND OF THE INVENTION

1. Field of the Invention

The present invention relates to a bedding separator. More particularly, the present invention involves a tool designed to separate manure, loose hay and wet bedding from the stalls of all types of horses so as to recover reuseable bedding.

2. Prior Art

There are many patents that show the separation of wood shavings from animal manure. U.S. Pat. No. 5,927,513 issued to Hart discloses an apparatus in the form of a shaker that separates wood shavings from animal manure. U.S. Pat. No. 5,887,727 issued to Ames discloses an apparatus with functions that include sorting. U.S. Pat. No. 3,805,955 issued to Bixby et al., discloses a screen apparatus that separates coal/ores from sand. U.S. Pat. No. 5,417,044 issued to Russo discloses a horse mucking rake device.

SUMMARY OF THE INVENTION

A tool designed to separate manure, loose hay and wet bedding from the stalls of horses to recover reusable bedding (generally wood chips).

The tool is in the form of an elongated grate formed from a rectangular frame which includes a plurality of spaced parallel rods which will permit the passage of dry bedding through the spaces between the rods. The grate is placed at a 45 degree angle against the stall wall with the rods in a generally vertical orientation. The bottom of the grate is supported at its base or bottom on the edge of a cart or muck bucket. One tosses the sawdust and wood shavings against the grate. The material thrown onto the grate flows downwardly by gravity causing the soiled bedding and manure to flow downwardly into the cart or bucket. The still usable bedding will pass through the rods and will be redistributed after the stall has been screened of all the soiled bedding. The frame is also provided with side members which extend in parallel relation with the rods for the majority of the upper portion of the frame. However the side members are bent convergently inwardly adjacent the lower end of the frame where they connect with an end adaptor that is notched to provide a proper fit with a conventional muck bucket. The converging shape at the lower end of the frame or grate has the effect of funneling the refuse into the container.

DETAILED DESCRIPTION OF THE PREFERRED EMBODIMENTS

Figure 1:
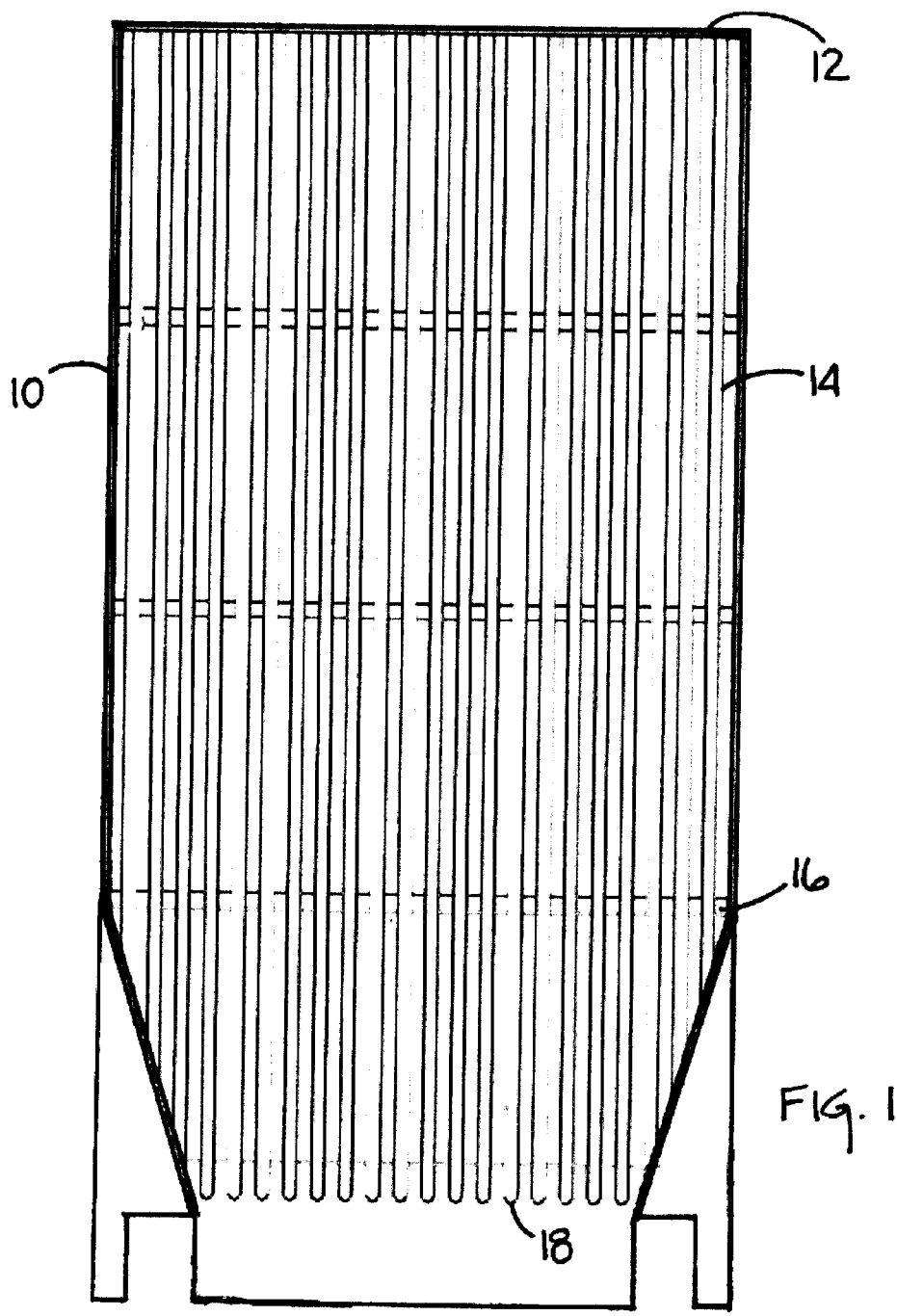
FIG. 1 is a plan view of the grate showing the rectangular frame and spaced parallel rods.
Figure 2:
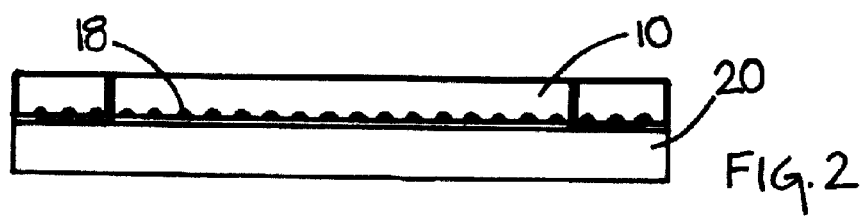
FIG. 2 is an end view taken from FIG. 1.
Figure 3:
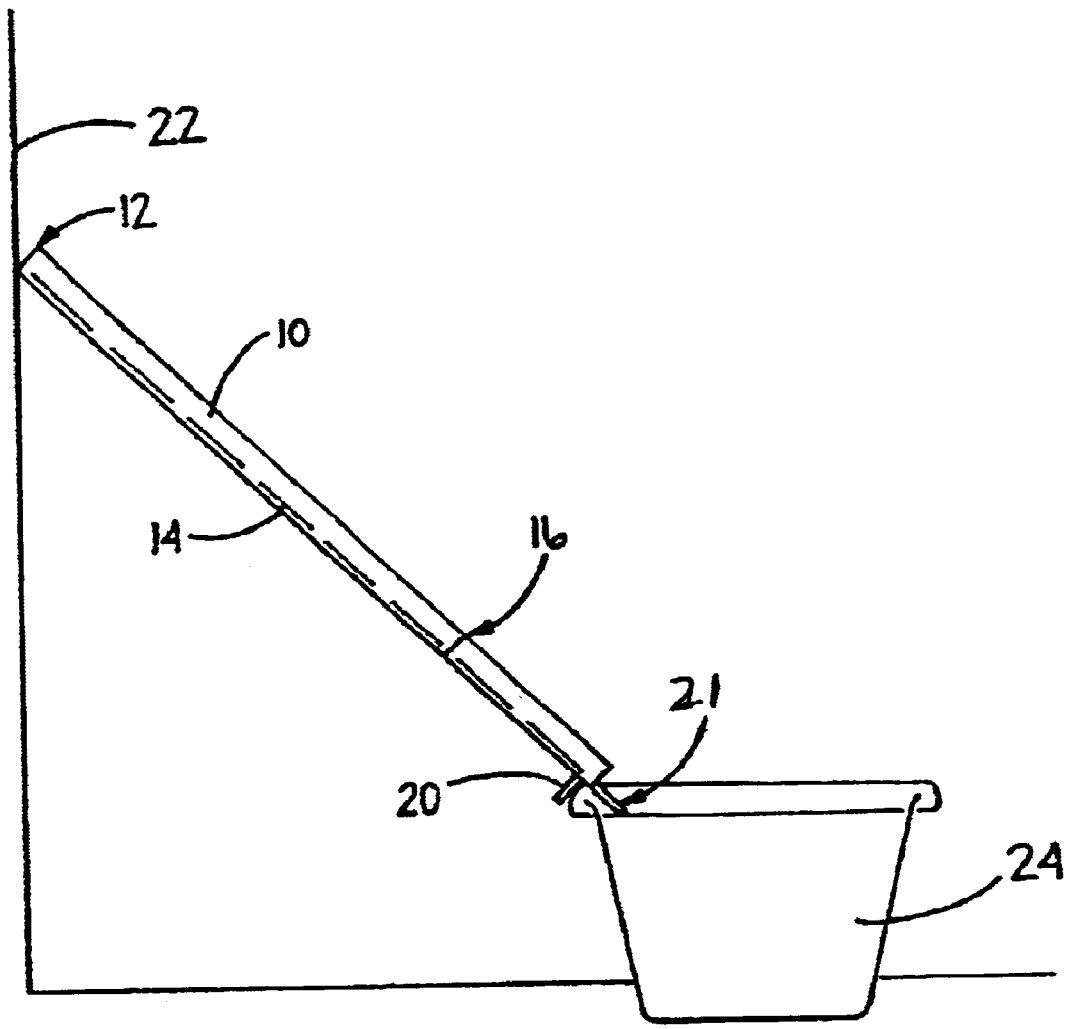
FIG. 3 is a side elevation of the grate of the present invention showing the same propped at a 45 degree angle against the wall of the stall and the bottom disposed against the side of a muck bucket.
Figure 4:
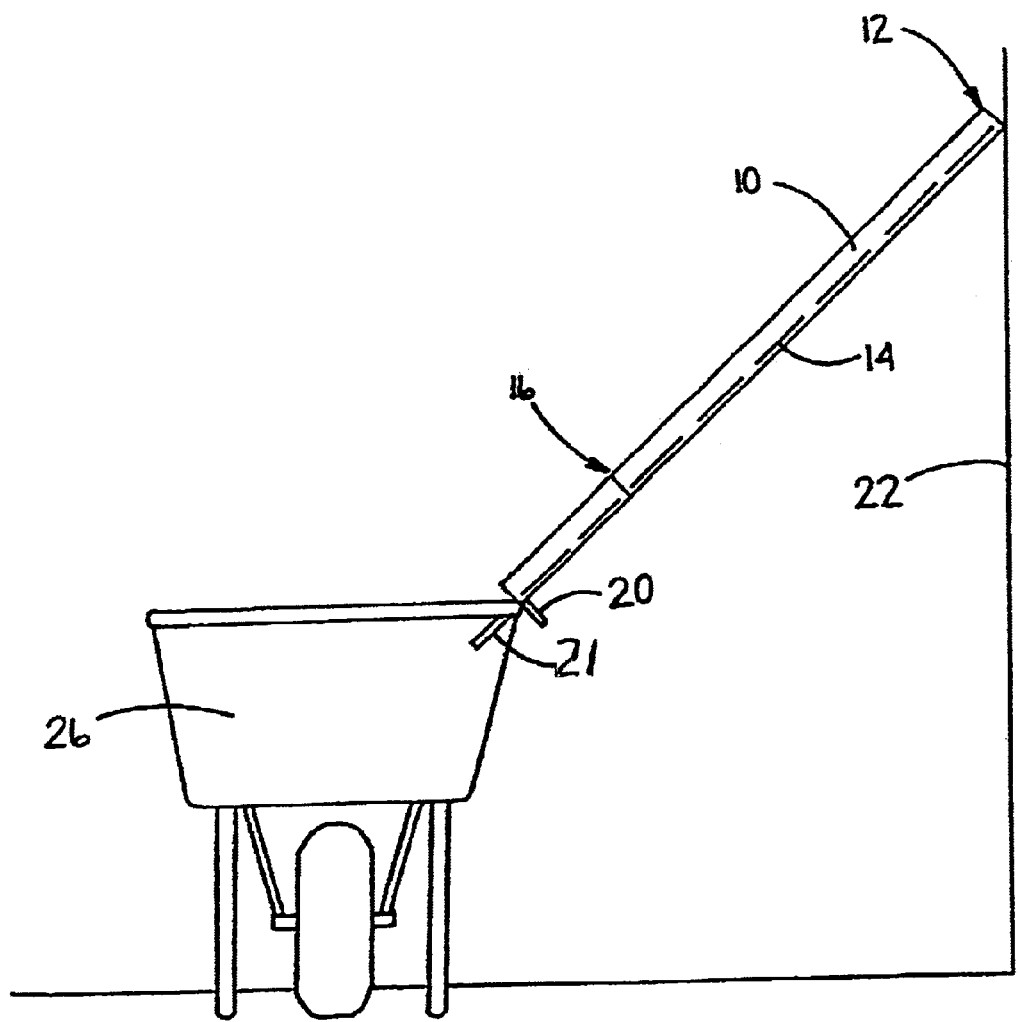
FIG. 4 is a view similar to FIG. 3 but showing the bottom of the grate disposed against the side of a cart or wheel barrow.

Referring to the drawings in detail, FIG. 1 shows a grate 10 in the form of a rectangular frame composed of a plurality of spaced parallel rods 14 connecting at their upper ends to a cross member 12 and having intermediate cross members 16. The frame also includes a pair of parallel side members 15 which extend parallel to the rods 14 for the majority of the upper end of the frame. However these sides 15 are bent at 17 so as to form a pair of converging walls 19. An adaptor 21 is connected to the lower end of the frame and has a pair of tapered portions 23 that mate with the converging ends 19 of the sides 15. The adaptor 21 is provided with a pair of spaced notches 25 which are adapted to be received over the rim of a conventional muck bucket. The adaptor 21 is also provided with a right angle portion 20 as shown in FIGS. 3 and 4 to assist in engaging the edge of the bucket 24 or cart 26. The rods 14 are preferably rounded at their upper and lower ends.

The lower ends 18 of the rods 14 extend over the upper part of the adaptor 21, but the adaptor extends into a muck bucket 24 as in FIG. 3 or a cart 26 (or wheel barrow) as in FIG. 4. In either figure, the grate 10 is shown as resting at a 45 degree angle against a wall 22.

Purely for the purpose of explanation, the parts can be made of metal or plastic. The grate has an overall length of about 40 inches and a width of about 20 inches. The rods have a diameter of $3/8$ inches with the spaces between the rods being about $1/2$ inch. The sides 15 of the rectangular frame are preferably about $1/8$ inch thick and 1 and $1/2$ inches wide. Again, the lower ends of the sides 19 are tapered convergently inwardly to funnel the refuse into the cart or muck bucket. These dimensions are merely illustrative and should not be considered as limiting.

Whereas the present invention has been described in particular relation to the drawings attached hereto, it should be apparent that other and further modifications of the present invention, apart from those shown or suggested herein, may be made within the spirit and scope of this invention.

What is claimed is:

1. A tool designed for separating manure, loose hay and wet bedding from a stall of an animal, comprising a rectangular frame supporting a plurality of spaced parallel rods and a pair of parallel side members, the rods being adapted to extend downwardly at an angle from a wall of the stall, the rods having lower ends adapted to extend into a receiver, whereby, when refuse is tossed from a floor of the stall onto the rods, manure, loose hay and soiled or wet bedding will flow down the rods into the receiver, while reusable bedding will pass between the rods for later reuse, the side members being bent adjacent a lower end of the frame to form a pair of inwardly converging members, wherein the tool is provided with an adapter at a lower end thereof mating with the converging members, the adapter having a portion extending at right angles thereto for further assisting in engagement with a rim of a receiver, the adapter extending into the receiver whereby manure, loose hay and soiled or wet bedding will flow down the gate over the adaptor and into the receiver, the converging members funneling material into the receiver.

2. A separating tool as set forth in claim 1 wherein the adaptor is provided with a pair of spaced notches to accommodate a rim of a conventional muck bucket.

* * * * *